United States Patent
Ardagna

(10) Patent No.: US 6,892,516 B1
(45) Date of Patent: May 17, 2005

(54) GARDEN SCREENING DEVICE FOR SIFTING AND SORTING MATERIAL

(76) Inventor: Salvatore Ardagna, 114 Williams Rd., Ashburnham, MA (US) 01430

( * ) Notice: Subject to any disclaimer, the term of this patent is extended or adjusted under 35 U.S.C. 154(b) by 0 days.

(21) Appl. No.: 10/752,030

(22) Filed: Jan. 7, 2004

(51) Int. Cl.⁷ .......................... A01B 35/264; B07B 1/49
(52) U.S. Cl. ............................................. 56/1; 209/421
(58) Field of Search .......................... 56/1, 2; 209/421, 209/204, 288, 370, 482, 279, 379, 385, 284; 435/290.3, 290.1, 290.2

(56) References Cited

U.S. PATENT DOCUMENTS

| | | | |
|---|---|---|---|
| 3,025,067 A | | 3/1962 | Raney et al. |
| 3,957,631 A | * | 5/1976 | Santo ......................... 209/421 |
| 4,303,508 A | | 12/1981 | Skretting |
| D265,094 S | * | 6/1982 | Williams .................. D15/147 |
| 4,426,289 A | | 1/1984 | Svehaug |
| 4,682,613 A | * | 7/1987 | DeLoach ................... 134/58 R |
| 4,767,218 A | | 8/1988 | Palus et al. |
| 4,885,012 A | | 12/1989 | Thompson |
| 4,960,247 A | | 10/1990 | Lundell |
| 5,118,414 A | | 6/1992 | Byers |
| 5,605,834 A | * | 2/1997 | Eberthson et al. ....... 435/290.3 |

* cited by examiner

*Primary Examiner*—Robert E Pezzuto

(57) ABSTRACT

A garden screening device for sifting and separating gravel, rocks, stones, and other debris from useful and valuable soil includes a screening drum mounted on a rotatable base supported on a carriage assembly, the screening drum and base interconnected to a drive motor and pulley for rotating the drum so that useful and valuable soil can be separated and sifted through the screen mesh of the drum by rotation of the drum and directed to the ground by a slide while the unwanted debris is retained in the drum for removal by tilting the screening drum in the direction opposite of the screening drum's operational sifting and separating disposition.

9 Claims, 5 Drawing Sheets

US 6,892,516 B1

GARDEN SCREENING DEVICE FOR SIFTING AND SORTING MATERIAL

FIELD OF THE INVENTION

The present invention pertains to devices that screen and separate usable and valuable material from unwanted and unusable material, and more particularly pertains to a device for separating and screening unusable soil, rocks, gravel, stones, and like debris from the usable and valuable soil.

BACKGROUND OF THE INVENTION

The separating, shredding, mixing, pulverizing, sifting and sorting of material is a common and widespread agricultural and industrial application and practice. Such applications are to be found in the steel, glass, chemical, pharmaceutical, and food processing industries where liquid, semi-liquid, and liquid and solid product must be mixed and sifted, separated and sorted for transformation into a usable and valuable end product or commodity.

However, the above processes are applicable not only for large-scale industries but also for small scale concerns and businesses as well as individuals involved in activities such as building, remodeling, renovating, landscaping, gardening and general outside work. Thus, in situations such as landscaping, preparing a garden or starting a lawn as part of a new housing project, a primary task is soil preparation. The soil must be screened and sifted in order to separate and remove the usable and valuable soil—topsoil or loam, for example—from the unwanted and unusable soil and other debris found therein. The other debris may include such items as stones, rocks, gravel, roots, branches, and bulk waste, trash, and rubbish that has not been broken down or decomposed.

Some common ways of sifting and sorting through soil material include simply walking the parcel and manually removing the clumps of debris, using a shovel or other implement to manually sift and sort through the soil, and placing a flat mesh screen on a wheelbarrow and then placing loads of soil on the screen for separating the unusable and unwanted debris from the valuable soil. These methods are time consuming and labor intensive, and produce uneven results as far as the quality of the soil screened and sorted.

The prior art discloses a wide variety of devices for separating, sorting, spreading, shredding and mixing material to obtain a desirable end product.

For example, the Raney et al. patent (U.S. Pat. No. 3,025,067) discloses a flail beater unit attached to the rear of a manure spreader unit. Manure is brought to the flail beater unit by a conveyor whereupon the manure is beaten and spread by individual flails rotating on a center shaft.

The Skretting patent (U.S. Pat. No. 4,303,508) discloses a screening device wherein an externally slotted screen drum is enclosed within a housing so that primarily cellulose-type material passes through the slots when moving from the inlet to the outlet.

The Svehaug patent (U.S. Pat. No. 4,426,289) discloses a liquid-solid screen separator that includes a slurry screening assembly mounted within a rotatable housing for screening the slurry, a compression roller freely rotatable therein for further compressing the material, and an augur for moving the material through the separator.

The Palus et al. patent (U.S. Pat. No. 4,767,218) discloses a vat for mixing delicate material and which includes a carriage assembly linearly movable on a beam member, and pendent from the carriage assembly are mixing paddles having blades that can be selectively angled for achieving maximum mixing results.

The Thompson patent (U.S. Pat. No. 4,885,012) discloses a conveyance apparatus for moving granular matter, and includes a container having inlet and outlet conduit, a rotary screen assembly within the housing, and a rotary valve for continuously moving the material.

The Lundell patent (U.S. Pat. No. 4,960,247) discloses a compost shredder wherein compost is fed into the hopper for shredding by hammers pivotally mounted to a shaft that extends through a drum that receives the compost from the hopper.

The Byers patent (U.S. Pat. No. 5,118,414) discloses a screening device for removing unwanted material from water, and includes a plurality of upright annular discs having peripheral teeth for catching and directing unwanted material to a collection zone.

Nonetheless, despite the ingenuity of the above devices, there remains a need for a simple, portable screening device for small business concerns, homeowners and individuals for quickly and efficiently screening and sorting unwanted material from usable soil.

SUMMARY OF THE INVENTION

The present invention comprehends a portable garden screening device for mixing, sifting, sorting, and separating rocks, gravel, pebbles, stones, twigs, leaves, roots and other debris from useful and valuable soil. The garden screening device can be used by both individual homeowners and professionals to improve the soil quality of their garden, yard, lawn or parcel for seeding, planting, and general health.

The garden screening device includes a carriage assembly composed of two opposed frameworks mounted on two wheels for portability from site to site. The opposed frameworks are interconnected by support members, and one framework includes a motor mount platform that supports a motor and a gear box arrangement. Pivotally mounted to the upper ends of both frameworks is a base, and the base is rotated by a pulley assembly driven by the motor. A screening drum is securable to the base, and rotates therewith, with the material to be mixed being placed into the drum so that the useful soil passes through the apertures of the screening drum while the unwanted and discardable debris is retained in the drum. A handle interconnected to the base allows the user to pivot the base and screening drum between an operational position and an opposite dump position whereby the unwanted material can be dumped from the drum into, for example, a wheelbarrow.

It is an objective of the present invention to provide a garden screening device that allows for a portable and efficient way for a homeowner to improve the soil quality of his or her property.

It is another objective of the present invention to provide a garden screening device that efficiently sifts, sorts, and separates gravel, stones, rocks and other debris from useful high quality loam.

It is yet another objective of the present invention to provide a garden screening device having interchangeable hoppers of different geometric configurations for enhancing the sifting and separating process.

It is still another objective of the present invention to provide a garden screening device having interchangeable hoppers each of which has a different mesh size.

Still another objective of the present invention to provide a garden screening device that is operable by either a gas or electric motor.

Still yet another objective of the present invention is to provide a garden screening device that includes a hopper having fins or vanes mounted to the interior of the hopper for improving the circulation, sifting, and separation of the material therein.

A still further objective of the present invention is to provide a garden screening device that can be used with both dry and wet soil.

These and other objects, features and advantages will become apparent to one skilled in the art upon a perusal of the following detailed description when read in conjunction with the following drawings and appended claims.

DETAILED DESCRIPTION OF THE PREFERRED EMBODIMENT

Figure 1:
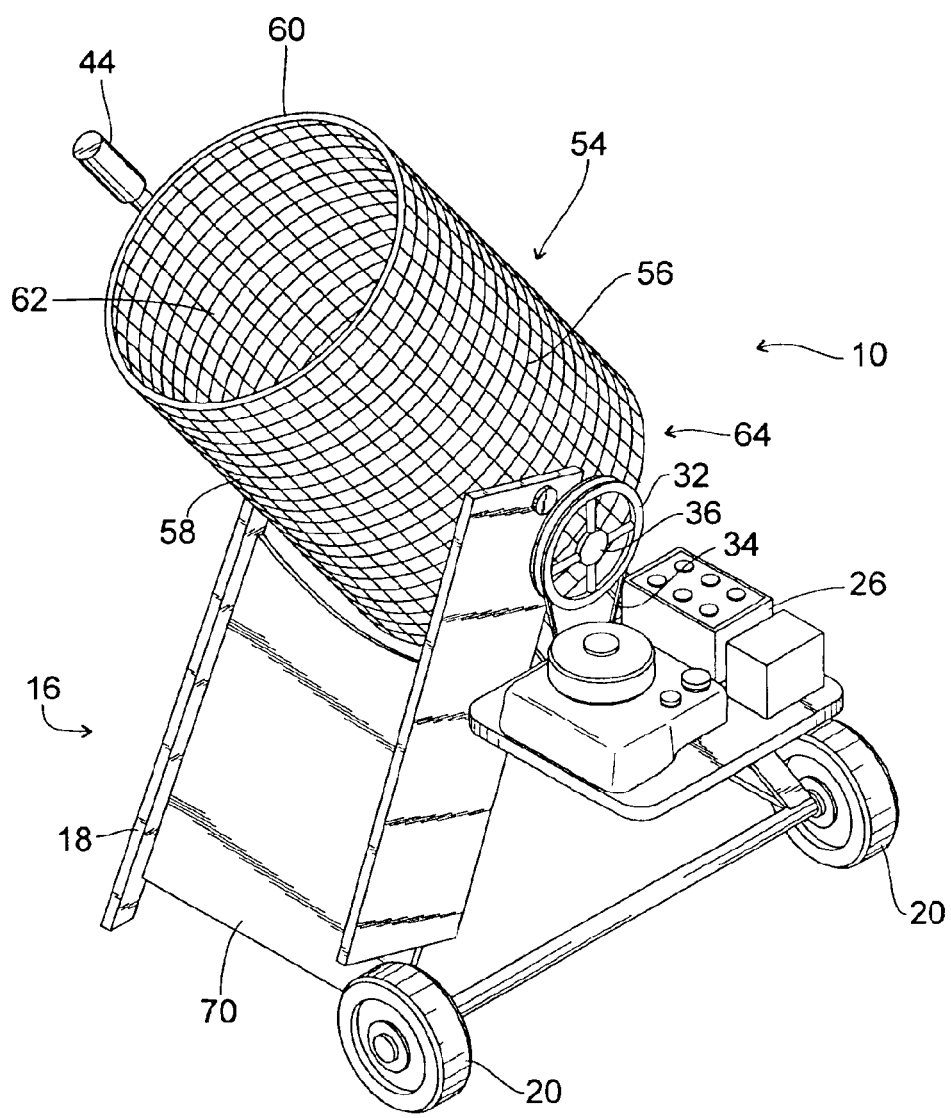
FIG. 1 is a perspective view of the preferred embodiment of the garden screening device of the present invention.
Figure 2:
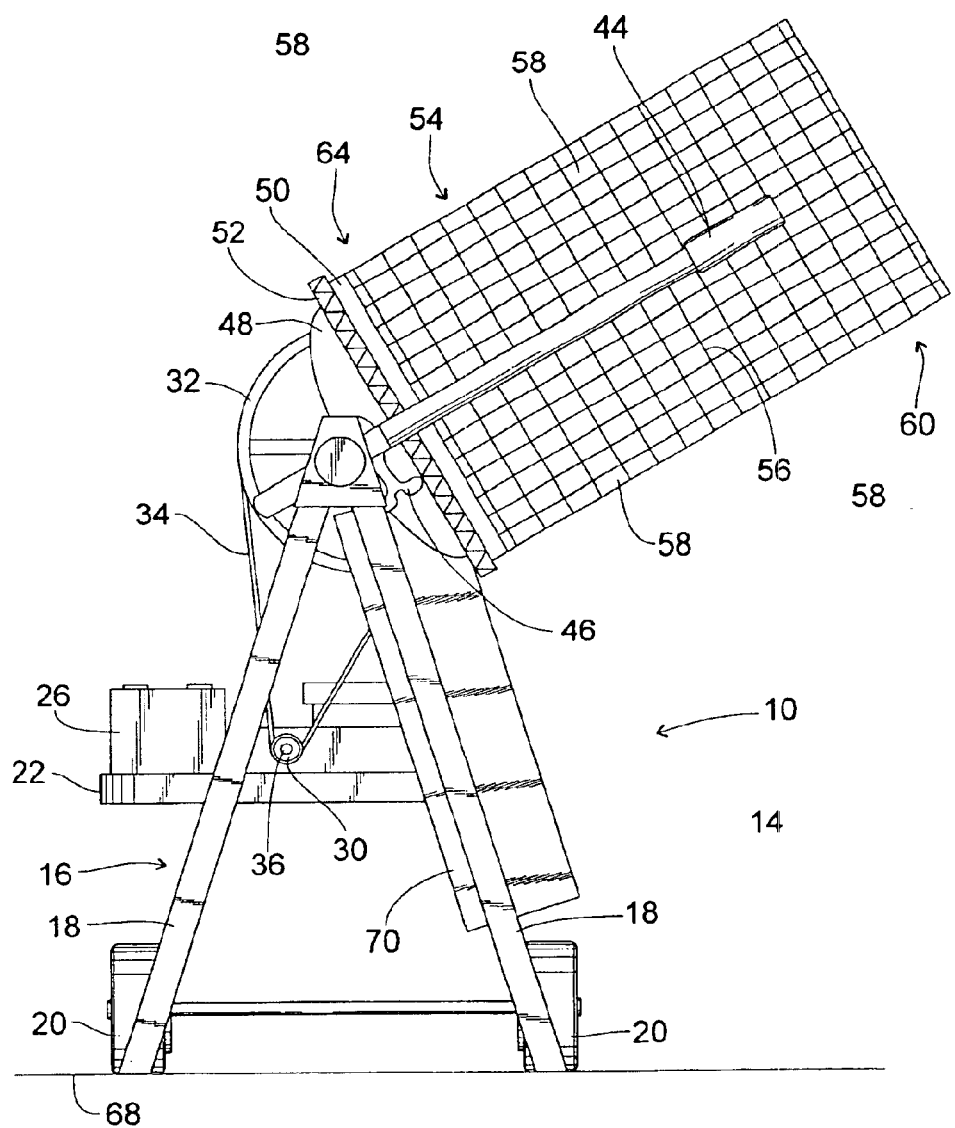
FIG. 2 is a side elevational view of the garden screening device illustrating the disposition of the device when in the screening and sifting mode.
Figure 3:
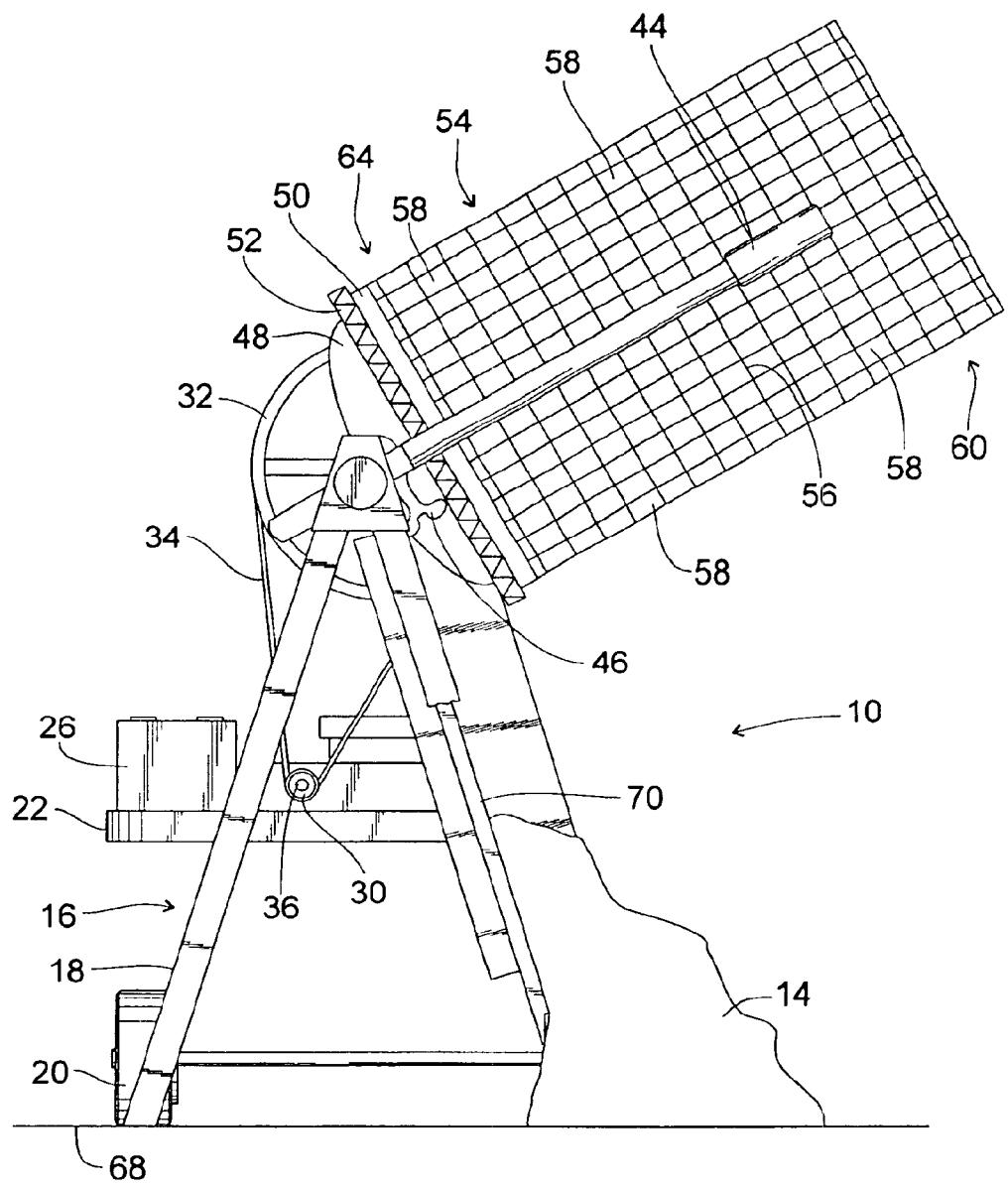
FIG. 3 is a side elevational view of the garden screening device illustrating the deposition of useful, valuable soil on the ground adjacent to the garden screening device.

Illustrated in FIGS. 1–6 is a portable garden screening device 10 for mixing, sifting, sorting and separating gravel, stones, rocks, pebbles, roots, twigs, branches and other such undesirable and unwanted soil and debris material 12 from the useful and valuable soil and loam 14. The garden screening device 10 can be used by both professionals and individual homeowners to improve and enhance the quality of their soil for seeding, planting, gardening and landscaping.

As shown in FIGS. 1–4, the garden screening device 10 includes a carriage assembly 16 that includes opposed triangular-shaped frameworks 18 comprised of support members of any durable and weather resistant material such as angle iron members. The upright support members are joined together by cross supports. The garden screening device 10 includes at least two wheels 20 connected by an axle and mounted to the lower ends of the respective frameworks 18. The wheels 20 provide for the portability of the garden screening device 10 so that the device 10 can be moved to different positions at one work site and to different work sites.

As shown in FIGS. 1–4, a motor mount platform 22 is secured to one of the triangular-shaped frameworks 18, and disposed on the motor mount platform 22 is a motor drive means that includes a motor 24, a gear box or gear case 26, and a main drive shaft 28. The motor 24 can be either electric powered or gasoline powered, and preferably the motor 24 should be between 1½ to 5 horsepower. The motor 24 will also include the appropriate start and stop switches or buttons. The garden screening device 10 of the present invention can also be adapted for support on four wheels, and with either the electric or gasoline motor 24, the device 10 could become a self-propelled machine.

As shown in FIGS. 1–5, the main drive shaft 28 is engaged to a pulley assembly, and, more specifically, the main drive shaft 28 of the motor 24 is connected to a drive pulley 30. The drive pulley 30 is interconnected to a larger driven pulley 32 by an endless belt 34, and the larger pulley 32 is journaled to the upper end of one triangular framework through a main pulley shaft 36. The inner end of the main pulley shaft 36 includes main pulley teeth that drivingly engage structure hereinafter further described. Illustrated in FIG. 6 is a curvilinear cross arm 38 that extends between and is pivotally attached to the upper ends of both triangular-shaped frameworks 18. A stud 40 projects from the midpoint of the curvilinear cross arm 38. Journaled to the upper end of the triangular framework 18 opposite of the upper end to which the larger pulley 32 and main pulley shaft 36 is mounted is a secondary toothed shaft 42. A handle 44 is pivotally interconnected to the secondary shaft 42 for manual pivotal movement between a use position and a dump position. Also, a dump or safety release latch 46 is mounted to the upper end of the framework 18 and is interengaged to the handle 44 to release the handle 44 for manual pivotal movement between the use or screening position and the dump position.

As shown in FIGS. 1–6, a screening drum bowl or base 48 is pivotally mounted at the upper ends of each triangular-shaped framework 18. The bowl or base 48 is attached by the pin, bolt or stud 40 to the cross arm 38 so that the pivotal movement of the cross arm 38 results in the concomitant pivotal movement of the base 40. The base 48 includes an inner concavity whereupon at least some of the material 12 and soil 14 temporarily resides during the mixing, sifting, separating and sorting action. The base 48 includes an inner annular lip or rim 50 and along the peripheral edge of the base 48 are base rim teeth 52 that project opposite of the rim 50. The teeth 52 of the base 48 are drivingly engaged by the teeth of the main pulley shaft 36 and the secondary shaft 42 for rotating the base 48.

As shown in FIGS. 1–5, the various kinds of material 12 and soil 14 to be mixed, sorted, sifted and separated by the device 10 are placed in a screening drum 54 that is removably mountable to the rim 50 of the base 48. The screening drum 54 is a cylindrical wire screen mesh 56 having a plurality of apertures 58 with the wire screen mesh 56 in one preferred configuration being ¼ inch diameter and the aperture 58 size being a ½ square. The screening drum 54 can come in many interchangeable configurations, and other aperture 58 sizes can be ¼ inches, ¾ inches and ⅜ inches. In addition, although the preferred geometric configuration of the screening drum 54 is cylindrical as shown in FIGS. 1–5, the screening drum 54 can be in the form of other non-cylindrical geometric shapes such as an octagonal shape. The screening drum 54 includes an outlet end 60 for receiving the material, an interior receptacle or mixing chamber 62, and an opposite mixing end 64 where the material 12 and soil 14 is mixed, sifted and sorted. The base 48 also serves as the floor surface for supporting the material 12 and the soil 14 while both are being mixed, sorted, separated and sifted.

Figure 5:
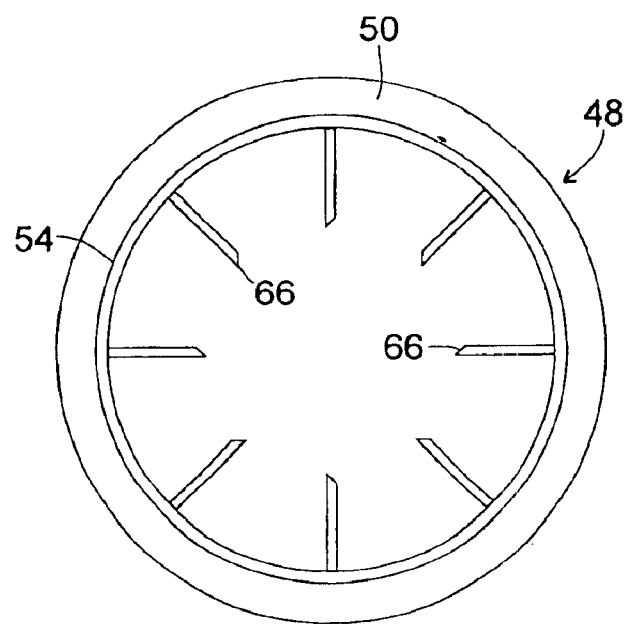
FIG. 5 is a front elevational view of the garden screening device illustrating the addition of vanes to the interior of the screening drum.
Figure 6:
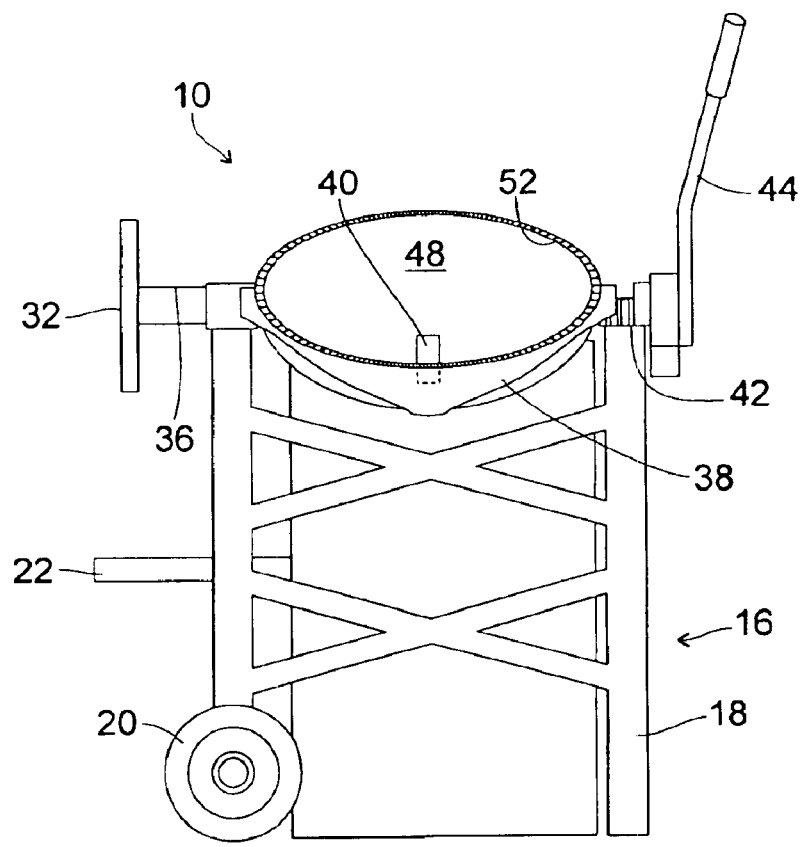
FIG. 6 is a rear elevational view of the garden screening device illustrating the upper ends of the frameworks and the pivotal mounting of the base thereto.

In addition, as shown in FIG. 5, the interior chamber 62 of the screening drum 54 can be modified to enhance the mixing of the material 12 and soil 14 by the addition of fins or vanes 66. The vanes 66 can be secured to either the base 48 or the screen mesh 56 and would project into the chamber 62 for enhancing the disturbance and circulation of the material 12 and soil 14 for the sifting, sorting and separating thereof. Moreover, the vanes 66 provide a shearing action on the material 12 and soil 14 thereby breaking down, for example, larger clumps of soil 14. The configuration of the vanes 66 shown in FIG. 5 represents one of many possible arrangements for the vanes 66. In order to direct or guide the useful and valuable soil or loam 14 down onto the ground 68 for collection, a soil slide 70 is angularly mounted to the carriage assembly 16 and extends between and is secured to both frameworks 18. The soil slide 70 is positioned adjacent and below the mixing end 64 of the screening drum 54 so that the valuable soil 14 falls directly on the slide 70 for conveyance to the ground 68.

Figure 4:
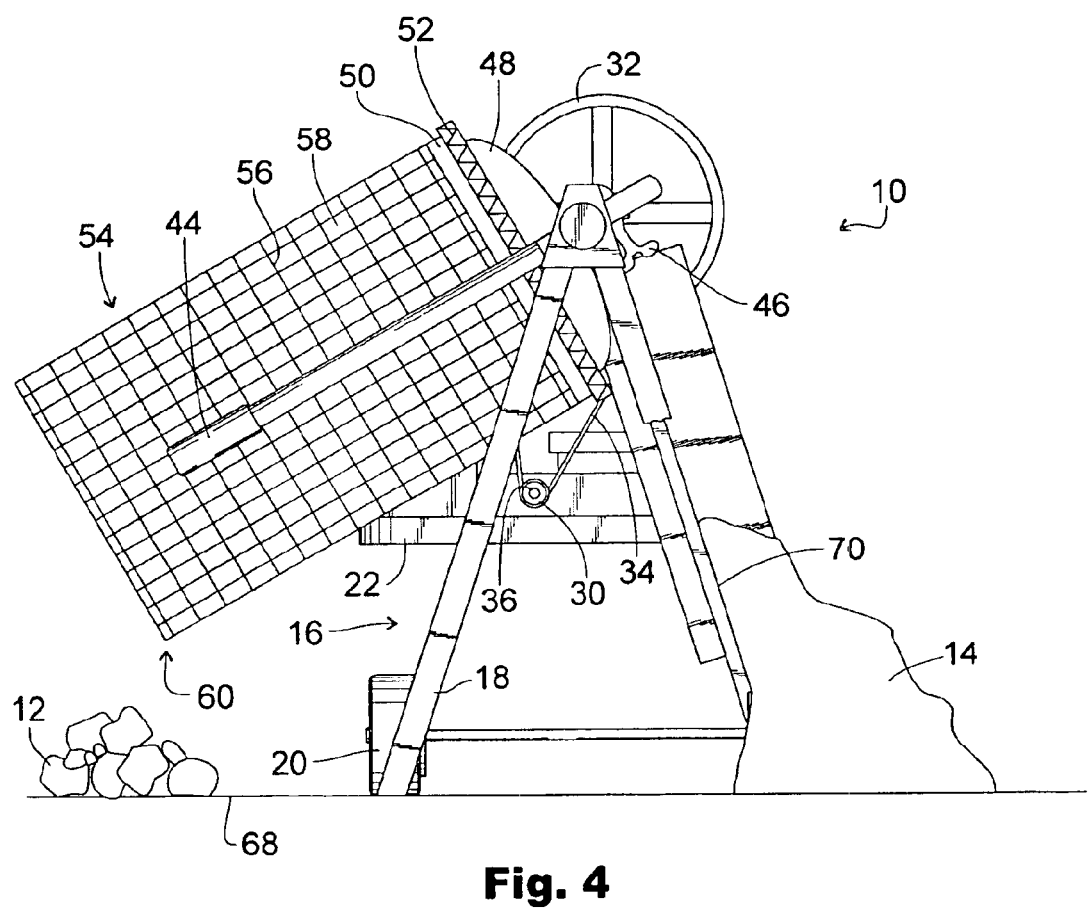
FIG. 4 is a side elevational view of the garden screening device illustrating the disposition of the device when in the dump mode or position.

In operation the first step is to start the motor 24. This engages the pulley assembly and turns the main drive shaft 28 and the main pulley shaft 36 thus causing rotation of the base 48 and the screening drum 54 mounted thereon. Soil material including the rocks, stones, gravel, limbs, twigs and other debris is shoveled into the interior chamber 62 of the screening drum 54 and into the mixing end 64 of the drum 54. As the screening drum 54 rotates the circulation, mixing, sifting, sorting and separating of the material 12 and soil 14 occurs whereupon the valuable loam 14 will fall through the screen mesh apertures 58 and travel down the slide 70 for collection on the ground 68 while the undesirable debris accumulates in the mixing end 64 of the screening drum 54. When a sufficient amount of unusable debris has accumulated in the screening drum 54, the motor 24 is stopped and the safety release latch 46 is pulled. This permits the individual to pivot the handle 44 rearward thereby also pivoting or rotating rearward the cross arm 38, the base 48, and the screening drum 54 as a unit so that drum 54 is moved to the dump position, as shown in FIG. 4, for dumping the debris material 12 into a wheelbarrow or onto the ground 68. The handle 44 is then pivoted in the opposite forward direction to the original screening position. This action locks the safety latch 46 in place preventing the inadvertent movement of the handle 44 while the screening drum 54 is in operation. The shoveling of material into the screening drum 54 and the mixing, sifting, separating and the dumping of the unwanted debris material 14 can be repeated until the desired area, garden, lot, or yard is screened. Using interchangeable drums having screen mesh apertures of varying sizes, the stones, gravel, pebbles and other debris can be re-screened as desired for further uses.

It should be noted that various other modifications of the invention will become apparent to those skilled in the art and the invention is accordingly not limited to the preferred embodiment only but includes those modifications and variations within the scope and spirit of the appended claims.

I claim:

1. A garden screening device for sifting and separating unwanted soil debris material from valuable soil material, comprising:
   a movable carriage assembly having a pair of wheels providing for the movement of the carriage assembly on the ground surface;
   a triangular-shaped framework mounted to the carriage assembly and extending upwardly therefrom;
   a screening drum pivotally mounted to the framework so that the screening drum can pivot 180 degrees between a material screening position and a material dump position;
   the screening drum capable of rotation on the framework for sifting and screening valuable soil material from debris material;
   a soil slide mounted on the framework adjacent the material screening position of the screening drum;
   means to selectively rotate the screening drum so that valuable soil material is sifted and separated from debris material;
   a manually operable handle interconnected to the screening drum for selectively pivoting the screening drum between the material screening position and the material dump position; and
   rotation of the screening drum when the screening drum is in the material screening position sifts and separates the valuable soil material from the debris material so that the valuable soil material passes through the screening drum and falls onto the slide for conveyance down the slide and collection on the ground while the debris material is contained within the screening drum, and manually pivoting the screening drum to the dump position allows for the dumping of the debris material on the ground at a location that is separate from the location of the valuable soil material.

2. The garden screening device of claim 1 wherein the screening drum includes a mixing end and an opposite wide-mouth outlet end to facilitate the loading and dumping of the soil material.

3. The garden screening device of claim 2 wherein the screening drum includes non-cylindrical shapes for enhancing the circulation and disturbance of the soil material within the screening drum to improve the sifting and separating of the debris soil material from the valuable soil material.

4. The garden screening device of claim 3 wherein the screening drum includes a plurality of vanes mounted to the screening drum and extending within the interior of the drum for enhancing the circulation and mixing of the soil material to improve the sifting and separation of the debris soil material from the valuable soil material.

5. A garden screening device for sifting and separating debris material from valuable soil material, comprising:
   a portable carriage assembly having a pair of wheels allowing for the movement of the carriage assembly on the ground;
   a triangular-shaped framework mounted to the carriage assembly and extending upwardly therefrom;
   a screening drum pivotally mounted to the framework so that the screening drum can pivot 180 degrees between a material screening position and a material dump position;
   the screening drum including a mixing end and an opposite wide-mouth outlet end for facilitating the loading therein and dumping therefrom of the material;
   the screening drum capable of rotation on the framework for sifting and separating the valuable soil material from the debris material;
   a slide mounted on the framework adjacent the material screening position for conveying the valuable soil material down to the ground;
   means to selectively rotate the screening drum so that the valuable soil material is sifted and separated from the debris material by gravity and the continuous rotation of the screening drum;
   a manually operable handle interconnected to the screening drum for selectively pivoting the screening drum between the material screening position and the dump position; and the continuous rotation of the screening drum causing the sifting and separation of the debris material from the valuable soil material so that the valuable soil material passes through the screening drum and falls onto the slide for conveyance down the slide to collection on the ground while the debris material remains within the screening drum whereupon halting the rotation of the screening drum and manually pivoting the handle causes the screening drum to pivot to the dump position resulting in the dumping of the debris material on the ground and at a location that is separate from the location of the valuable soil material.

6. The garden screening device of claim 5 wherein the screening drum includes non-cylindrical shapes for enhancing the circulation and disturbance of the soil material within the screening drum thereby improving the sifting and separation of the debris material from the valuable soil material.

7. The garden screening device of claim 6 wherein the screening drum includes a plurality of vanes mounted to the screening drum and projecting within the interior of the screening drum for enhancing the circulation and mixing of the soil material thereby improving the sifting and separation of the valuable soil material from the debris material.

8. A garden screening device for sifting and separating valuable soil material from debris material, comprising:

a movable carriage assembly having a pair of wheels allowing for the movement of the carriage assembly on the ground;

a triangular-shaped framework mounted to the carriage assembly and extending upwardly therefrom;

a screening drum pivotally mounted to the framework so that the screening drum can pivot 180 degrees between a material screening position and a material dump position;

the screening drum including a mixing end and an opposite wide-mouth outlet end for facilitating the loading and dumping of the material;

a slide mounted on the framework adjacent the material screening position for conveying the valuable soil material down to the ground for collection thereon;

means to selectively rotate the screening drum so that the valuable soil material is sifted and separated from the debris material by gravity and the continuous rotation of the screening drum;

a manually operable handle interconnected to the screening drum for selectively pivoting the screening drum between the material screening position and the dump position;

the drum including a plurality of vanes projecting into the interior of the drum to enhance the circulation and mixing of the material; and the continuous rotation of the screening drum causing the sifting and separation of the debris material from the valuable soil material so that the valuable soil material passes through the screening drum and falls onto the slide for conveyance down the slide to collection on the ground while the debris material remains within the screening drum whereupon halting the rotation of the screening drum and manually pivoting the handle causes the screening drum to pivot to the dump position resulting in the dumping of the debris material on the ground and at a location that is separate from the location on the ground of the valuable soil material.

9. The garden screening device of claim 8 wherein the screening drum includes non-cylindrical shapes for enhancing the circulation and disturbance of the material within the screening drum thereby improving the sifting and separation of the valuable soil material from the debris material.

* * * * *